United States Patent [19]  
Erith et al.

[11] 3,894,494  
[45] July 15, 1975

[54] LOCATING AND LOCKING DEVICES
[75] Inventors: Cyril Edward Erith, Deerhurst; Gordon Charles Elkins, Tewkesbury, both of England
[73] Assignee: Multi-Stroke Handbrake Controls Limited, Tewkesbury, England
[22] Filed: Dec. 8, 1972
[21] Appl. No.: 313,540

[30] Foreign Application Priority Data
Dec. 10, 1971 United Kingdom............... 57487/71
Jan. 15, 1972 United Kingdom................. 2048/72

[52] U.S. Cl............................................. 105/366 B
[51] Int. Cl.² ....................................... B61D 17/00
[58] Field of Search ................... 248/361 R, 119 R; 105/366 B, 366 C

[56] References Cited
UNITED STATES PATENTS
3,724,796 4/1973 Hawkins......................... 248/361 R
FOREIGN PATENTS OR APPLICATIONS
1,215,643 12/1970 United Kingdom............. 248/361 R
1,245,535 9/1971 United Kingdom............. 248/361 R Primary Examiner—Edward C. Allen
Attorney, Agent, or Firm—Cushman, Darby & Cushman

[57] ABSTRACT

A twistlock, for use to locate and lock a transport container in position, has a locking bolt which can be raised and turned to lock the container in position and which is retractable when not in use. The bolt is associated with a locating body against which the container locates prior to locking by the bolt. A mounting body, for fixing to a rod vehicle trailer or the like, is of fabricated construction and an assembly, comprising the locking bolt and the locating body, is slidable in the mounting body between the raised operative position and the retracted inoperative position. The assembly includes an operating lever fixed to the bolt for operation of the latter, and the complete assembly when retracted can be raised as a whole by the lever and thereafter turned when it seats on the mounting body to retain the assembly in the raised operative position.

Figures 3, 4:
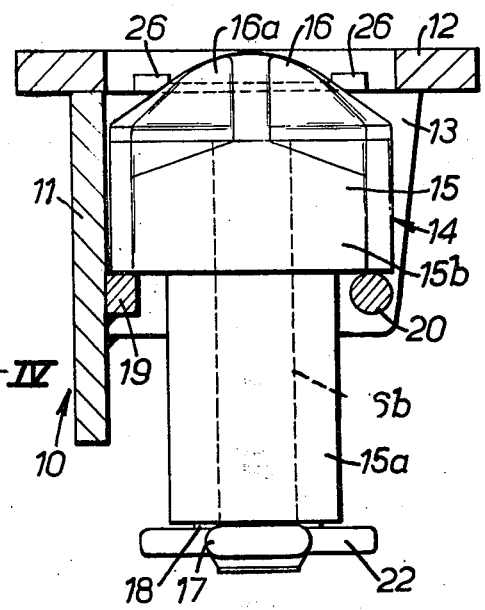

1 Claim, 8 Drawing Figures 3,894,494

LOCATING AND LOCKING DEVICES

This invention relates to devices for use to locate and lock transport containers in position on road vehicle trailers, railway vehicles and the like. It relates particularly to devices of the type commonly referred to as "twistlocks" (which term is used hereinafter) and which employ a rotary locking bolt which can be raised and turned to lock a container in position and which is retractable when not in use, the bolt being associated with a locating body against which the container locates.

An object of the invention is to provide a twistlock with improved means for retaining a retractable assembly of locking bolt and locating body in the projecting raised position ready for location of a container.

According to one aspect of the invention a twistlock comprises a mounting body and an assembly which is slidable in the body between a raised operative position and a retracted inoperative position, which assembly comprises a container locating body, a rotary locking bolt mounted in the locating body and an operating lever fixed to the bolt so as to turn therewith between locking and unlocked positions, the arrangement being such that the assembly can be raised by means of the lever to a position above said operative position and then turned, after which on lowering to the operative position the locating body seats on the mounting body whereby to retain the complete assembly in the raised operative position. Preferably the seating on the mounting body also locates the locating body in the angular sense.

Preferably the mounting body is a welded steel fabrication comprising a backplate, an apertured top plate and two side guide plates between which the assembly is slidable. The locating body may comprise a lower cylindrical stem portion, which is a free sliding fit between the guide plates, and an enlarged upper end portion which is effective for container location and has parallel side flats the dimension between which is equal to the diameter of the lower portion so that the upper portion is also freely slidable between the guide plates when within the mounting body.

The upper portion of the locating body may have arcuate ends and the top plate may have a circular through aperture in which the upper portion can turn freely when the assembly has been raised so that the upper portion is above the guide plates, whereupon when lowered to said operative position the upper portion seats on the guide plates which may have upper edge slots in which the upper portion engages for the purpose of angular location of the locating body. In an alternative construction, in which the upper portion again seats directly on the guide plates, the guide plates have flat upper edges which seat in slots machined across said upper portion adjacent the ends thereof with such engagement providing the angular location of the locating body. In a further alternative construction the underface of the upper portion of the locating body may be machined to provide a square section immediately adjoining the lower portion, so that when the assembly is lowered to seat on the guide plates the square section lies between the guide plates and thus provides the required angular location.

Instead of the upper portion of the locating body seating on the guide plates, as in the foregoing alternative constructions, the requisite seating may be provided by the top plate. In such case the top plate does not have a through circular aperture although the aperture preferably has a circular upper section in which the upper portion of the locating body can turn between the retracted angular position, in which position it is raised between the guide plates, and the effective container locating position in which it engages a seating appropriately formed within the aperture.

In preferred embodiments seating of the locating body on the mounting body provides both retention of the assembly in the raised position and angular location of the locating body as has been described. However, in some circumstances it is acceptable for angular location of the locating body to be provided in service by engagement with the adjacent corner casting of a located container, and thus the inherent angular location so readily provided by the present invention is not necessarily an essential feature thereof.

Thus, according to another aspect of the invention the locating body, when the assembly is lowered from the fully raised position to said raised operative position, seats on the mounting body merely for the purpose of retaining the assembly in the raised position and in use angular location of the locating body is provided by a located container. In this case the locating body can again seat either on the guide plates or in the top plate aperture as has been described with respect to the more sophisticated arrangements which also provide angular location of the locating body.

Preferably retention of the assembly within the mounting body, with the head of the twistlock bolt withdrawn substantially flush with the top plate, also utilises the enlarged upper portion of the locating body. For this purpose the ends of the upper portion may sit on a projection from the backplate and on a front cross member which interconnects the guide plates, which member may be a bolt which can be removed to permit removal of the complete assembly for maintenance purposes. This has the additional advantage that the locating body can be fitted to a multi-purpose vehicle not supplied initially with twistlocks, the twistlock assemblies being fitted at a later date when container operation of the vehicle is desired.

In the retracted inoperative position the assembly preferably projects well below the guide plates, and below the mounting body as a whole. In preferred embodiments the depth of the guide plates is such that the operating lever is positioned just below the guide plates when the assembly is in the raised operative position, and thus can engage the guide plates to resist and upward pull on the bolt. A spring washer may be positioned between the lever and the lower end of the locating body to provide adequate stiffness to ensure that the assembly turns as a whole with the lever when free to do so in the fully raised position, when the locating body is angularly located the lever turning with the bolt against the frictional spring torque.

Means may be provided which ensure accurate positioning of the locking bolt in at least the locking position when the locating body is itself located in the operative position. Such means may include an abutment on the mounting body for engagement by the operating lever when the bolt reaches the locking position.

The provision of an abutment or restriction means which prevents the operating lever turning beyond the bolt locking position results in a construction which is "handed," whereas constructions in which lever movement is not so limited have the result that two locking positions 180° apart are available and the twistlock can be fitted to either side of a vehicle. So that this advantage is retained the means may be such that they can be fitted, or alternatively positioned, after the twistlock has been fitted to provide the appropriately handed operation for the side of the vehicle concerned.

Figure 1:
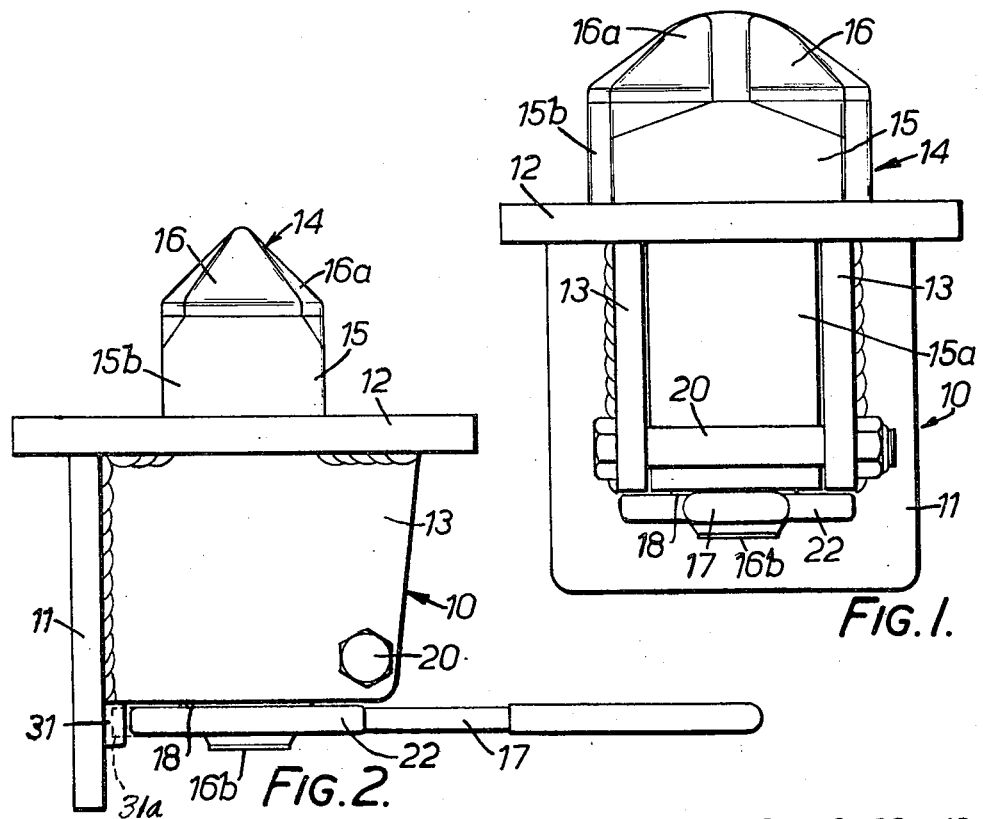
Figure 2:
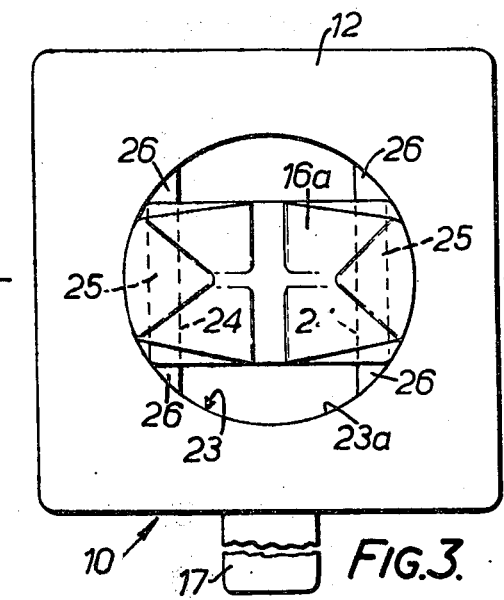

A twistlock in accordance with the invention is illustrated in the accompanying drawings, together with several variants, and will now be described, by way of example, with reference to the drawings. In the drawings:

FIG. 1 is a front view of the twistlock, with a central assembly thereof in the raised operative locating position, FIG. 2 is a corresponding side view thereof, FIG. 3 is a top plan view, but with the central assembly in the lowered inoperative position, FIG. 4 is a view, partly in section, on the line IV—IV in FIG. 3, and FIGS. 5 to 8 are detail fragmentary sectional views showing how, in the four variants, a central assembly is alternatively retained in the raised operative locating position.

A fabricated steel mounting body 10 comprises a flat steel backplate 11, allowing flush fitting at the rear, a slightly wider and flat rectangular top plate 12 which projects a short distance at the rear of the backplate 11, and two flat side guide plates 13 which project forwardly from the backplate 11 and are inset with respect to the side edges thereof. The mounting body 10, formed by welding the plates 11, 12 and 13 together, can be fitted without a central assembly 14, and can be welded to a vehicle around its complete periphery to provide firm fixing.

The central assembly 14 consists of a locating body 15 slidable between the guide plates, a twistlock bolt 16 with a ridged head 16a which rests on the top of the locating body 15 and a stem 16b which passes centrally completely through the body 15, so that the stem is supported throughout its complete length, a projecting operating lever 17 welded on the bottom end of the bolt stem 16b and a flat spring washer 18 between the lever 17 and the lower end of the locating body 15.

The locating body 15 has a lower cylinder stem portion 15a and an enlarged upper portion 15b which has parallel side flats, providing a width equal to the diameter of the lower portion 15a, and arcuate ends centred on the bolt axis. The ridged head 16a of the bolt is of generally conventional form and, in the inoperative position in the locking sense, exactly overlies the upper portion 15b of the locating body 15 with the lever 17 extending parallel to the backplate 11, i.e. in the fore-and-aft direction of a vehicle when fitted thereto, when the assembly 14 is in the lower retracted or "stowed" position illustrated in FIG. 4. In this retracted position the top of the bolt head is substantially flush with the upper surface of the top plate 12, and the two ends of the upper portion 15b of the locating body 15 respectively sit on a projection 19 welded to the backplate 11 and on a front cross member 20 in the form of a bolt 20 through the guide plates 13 adjacent lower front corners thereof. The bolt 20 can be removed to permit removal of the complete assembly 14, or is fitted at the same time as the assembly 14 when a vehicle is supplied with mounting bodies 10 already fitted but without central assemblies 14. It will be appreciated that if removability or subsequent fitting of the assembly 14 is not required, a permanent cross member can be fitted instead of the bolt 20.

The width of the locating body 15, i.e. the diameter of the lower portion 15a, provides a free-sliding fit between the guide plates 13, and the construction provides simple one-handed operation which will now be described. From the retracted stowed position of FIGS. 3 and 4 the assembly 15 is raised vertically by means of the lever 17 to a fully raised position in which a circular end 22 of the lever 17 surrounding the bolt stem 16b engages the bottom edges of the guide plates 13. In this position the upper portion 15b of the locating body 15 is free of the guide plates and the assembly 14 can be turned through 90° as a whole, after which the assembly 14 is lowered a small amount to the position of FIGS. 1 and 2 until the upper portion 15b of the locating body sits on the mounting body 10 to retain the assembly 14 in the raised operative position which it now occupies. To lock a container when located against the locating body 15, the bolt 16 is turned through 90° by means of the lever 17. Thus, at all times the exact condition of the twistlock is clear from the lever position.

Retention of the assembly 14 in the normal raised operative position with angular location of the locating body 15, in the basic arrangement of FIGS. 1 to 4, will now be described with particular reference to FIGS. 3 and 4. The top plate 12 has an aperture 23 through which the assembly 14 projects. This aperture has a circular upper section 23a and a lower through section defined by two parallel chords 24 in register with the inner sides of the guide plates 13. Between the chords the lower aperture portion has arcuate sections following the circular periphery of the upper portion 23a. At the sides of the lower aperture section, along the chords 24, the top plate 12 is milled away within the aperture 23 to provide side ledges 25 on which the locating body portion 15b seats when in the operative raised position, the milling leaving four corner lugs 26 between which the locating body fits to provide angular location therefor.

The diameter of the upper aperture portion 23a allows the upper body portion 15b to turn freely when it is lifted clear of the lugs 26. To lower the assembly 14 after the bolt 16 has been returned to the inoperative unlocking position the assembly 14 is lifted slightly to said fully raised position to clear the lugs 26 and turned back through 90° by means of the lever 17, whereupon it can be lowered between the guide plates 13 to the stowed position.

Figure 5:
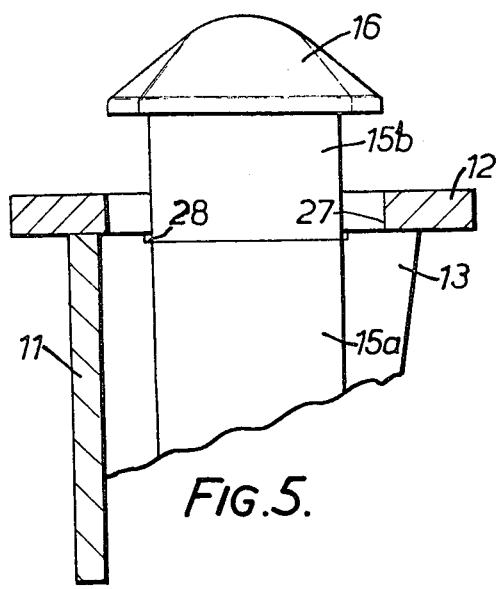

The variant means of retention of the assembly 14 in the raised position with angular location of the locating body 15 in that position will now be described. In the arrangement of FIG. 5 the top plate 12 has a circular through aperture 27 in which the upper portion 15b of the locating body 15 can turn freely, so that in plan view the guide plates 13 extend chordally across the aperture 27. Each guide plate 13 is slotted at 28 to receive the width of the upper portion 15b of the locating body 15, which portion seats in the slots 28 as shown in FIG. 5 not only to retain the assembly 14 in the raised operative position but also to provide angular location of the locating body 15b in the container locating position.

Figure 6:
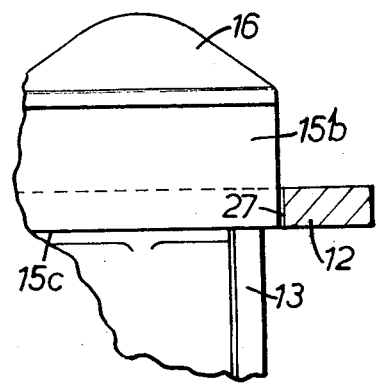
Figure 7:
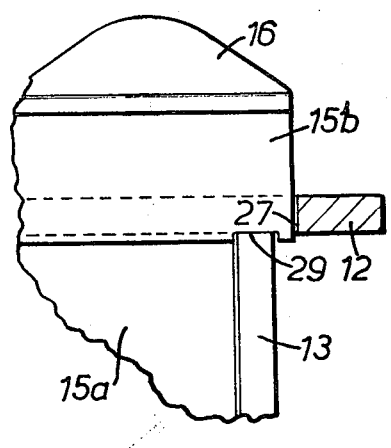
Figure 8:
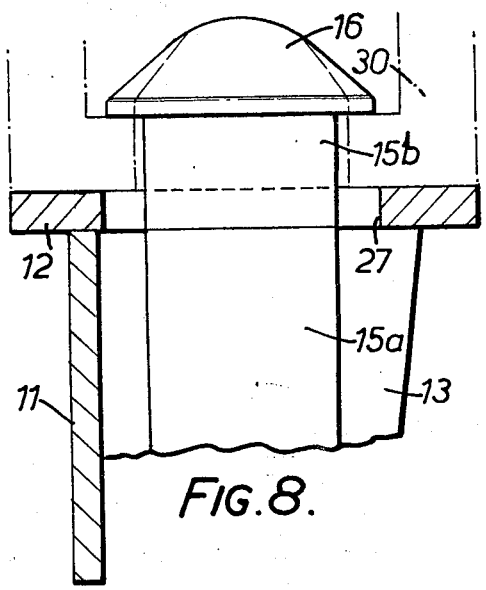

The three other variants also have a circular top plate aperture 27, and in the case of FIG. 7 the slots 28 in the guide plates of FIG. 5 are replaced by cross slots 29 in the underface of the upper portion 15b of the locating body 15. Thus, again the locating body 15 sits directly on the guide plates 13, and the slot 29 engagement provides angular location. In the case of FIG. 6 the body portion 15b is cut away to provide a square section 15c at the lower end of that portion, which square section 15c sits and fits between the guide plates 13 to provide angular location. In the final case of FIG. 8 no slots or other means of angular location are provided, and when sitting on the guide plates 13 (as shown in FIG. 8) the locating body 15 is angularly located solely by a located container 30.

The flat spring washer 18 of the assembly 14 has three functions. Firstly it provides a frictional torque which retains the lever 17 in any position to which it is moved, secondly the frictional torque ensures that the complete assembly 14 will move with the lever 17 when the locating body 15 is free to turn in the fully raised position, and thirdly it can provide a spring force which holds the head 16a of the locking bolt tight down against a container corner casting such as 30 (FIG. 8) with which it is in locking engagement. Reaction against any upward pull on the bolt 16 is provided by engagement of the circular end 22 of the lever 17 with the bottom edges of the guide plates 13, thereby limiting upward movement of the assembly 14 as a whole at said fully-raised position.

It will be appreciated that other means of angular location of the locating body 15 can be employed, for example pins may be set into the guide plates 13 instead of slotting the latter, and the milled corner lugs 26 of FIGS. 3 and 4 may be replaced by four pins set in the circular portion 23a of the top plate aperture 23.

Means may be provided to limit movement of the lever 17 to the bolt locking position when the assembly 14 is in the raised operative position. Such means may, for example, comprise a block as shown in broken lines at 31 in FIG. 2 welded to the backplate 11 and positioned for engagement by a projection 31a of the lever 17 when the latter reaches the locking position. Alternatively an obstruction for the same purpose can be fitted to the bolt or other cross member 20.

Alternatively, the obstruction limiting lever movement may be a retaining pin (not shown) driven into a prepared hole in the underface of the backplate projection 19. Alternative pin holes may be provided, so that the assembly is not "handed" and the appropriate pin hole can be used according to the side of the vehicle to which the twistlock is fitted.

Instead of providing location of the bolt in the locking position by restricting lever movement, the means may act between the bolt and the locating body. This has the advantage that the twistlock can still be un-handed, and it may be achieved by spring-loaded detent means. Thus, a detent spring and ball may be mounted in the locating body for engagement in recesses in a stem of the bolt which passes through the locating body, such engagement corresponding to the two alternative locking positions of the bolt. A further detent recess may be provided which is engaged in the unlocked position with the bolt head exactly overlying the locating body, i.e. in the container loading and unloading position. It will be appreciated that if preferred the detent ball may be mounted in the bolt stem for engagement with recesses in the locating body.

What we claim is:

1. A twistlock, comprising:
   a mounting body which includes a back plate and two side guide plates having a top plate secured thereon, the top plate having means defining an aperture therethrough which, in an upper portion thereof, is of circular section and which, in an adjoining lower portion thereof, is of non-circular section, having means defining two diametrically opposed, upwardly facing ledges; and
   an assembly which includes a container locating body with an enlarged upper end portion effective for container location, and a lower stem portion, a rotary locking bolt having a head mounted on the container locating body and a shank which proceeds downwardly therethrough, an operating lever secured to the locking bolt shank for turning the assembly angularly between locking and unlocking positions
   the assembly being of such non-circular configuration in plan, having a greater width in one direction and a lesser width in another, angularly spaced direction, as to have an angular orientation in which the container locating body enlarged upper end portion and rotary locking bolt head may be raised up between the two side guide plates and through the lower portion of the aperture, between the two ledges, whereupon upon turning the operating lever, the container locating body enlarged upper end portion becomes supported upon the two ledges;
   the two ledges having corresponding depressed central portions, which are at least as wide as said lesser width of said assembly, but which have upper surfaces located below that of the remainder of the two ledges, whereby, sufficient angular rotation of the assembly, when raised, will permit the container locating body enlarged upper end portion to settle into said depressed central portions, whereupon said assembly must be raised to clear said remainder of the two ledges before said assembly may be angularly rotated back to the first-described orientation, for being lowered back through said aperture.

* * * * *